US007917615B2

(12) United States Patent
Huang

(10) Patent No.: US 7,917,615 B2
(45) Date of Patent: Mar. 29, 2011

(54) APPARATUS AND METHOD FOR REAL-TIME MONITORING AND CONTROLLING OF NETWORKED APPLIANCES USING AN INTERMEDIATE SERVER

(75) Inventor: Jeffrey Huang, Santa Clara, CA (US)

(73) Assignee: Sextant Navigation, Inc., San Jose, CA (US)

( * ) Notice: Subject to any disclaimer, the term of this patent is extended or adjusted under 35 U.S.C. 154(b) by 218 days.

(21) Appl. No.: 12/172,179

(22) Filed: Jul. 11, 2008

(65) Prior Publication Data

US 2009/0019152 A1    Jan. 15, 2009

Related U.S. Application Data

(60) Provisional application No. 60/949,502, filed on Jul. 12, 2007.

(51) Int. Cl.
*G06F 15/173* (2006.01)
(52) U.S. Cl. ........................... 709/224; 709/223
(58) Field of Classification Search .................. 709/224, 709/223
See application file for complete search history.

(56) References Cited

U.S. PATENT DOCUMENTS

| | | | |
|---|---|---|---|
| 6,363,422 B1* | 3/2002 | Hunter et al. | 709/224 |
| 2002/0091815 A1* | 7/2002 | Anderson et al. | 709/223 |
| 2003/0084150 A1* | 5/2003 | Hansen et al. | 709/224 |
| 2004/0158630 A1* | 8/2004 | Chang et al. | 709/224 |
| 2005/0184852 A1* | 8/2005 | Lee | 340/3.1 |
| 2007/0124451 A1* | 5/2007 | Joshi et al. | 709/223 |

\* cited by examiner

*Primary Examiner* — Wing F Chan
*Assistant Examiner* — Kostas Katsikis
(74) *Attorney, Agent, or Firm* — Invent Capture, LLC; Samuel S. Cho

(57) ABSTRACT

A method and an apparatus for real-time monitoring and controlling of networked appliances over both a wide-area network (WAN) and a local-area network (LAN) using a Device State and Location Server (DSLS) as an intermediate server are disclosed. The DSLS is configured to either receive beacons from networked appliances periodically or poll networked appliances to update current activity status of each networked appliance. A unified user interface on a commanding device is configured to monitor the current activity status of each networked appliance by simply receiving updated data from the DSLS, thereby offloading a cumbersome task of tracking all networked appliances over the WAN and the LAN on its own. A color coding scheme and different icon shapes are used for ease of monitoring of the networked appliances. An orbital user interface software further helps to visualize location and current activity status of each networked appliance.

19 Claims, 5 Drawing Sheets

100

APPARATUS AND METHOD FOR REAL-TIME MONITORING AND CONTROLLING OF NETWORKED APPLIANCES USING AN INTERMEDIATE SERVER

BACKGROUND OF THE INVENTION

The present invention generally relates to communicating with networked electronic devices. More specifically, the invention relates to a method and apparatus for real-time monitoring and controlling of networked appliances using an intermediate server.

Modern technological development in computer systems and electronics increasingly emphasizes inter-operability and communications among a plurality of electronic devices in a widely-networked environment. For example, a refrigerator, which was typically a standalone appliance in the past, is now sometimes designed to be connected to a wide-area network such as the Internet, a cellular network, and/or WiMax to receive information about online recipes or grocery discounts at a local store. If the refrigerator is connected to the Internet, an owner of the refrigerator may even be able to change the refrigerator's temperature settings by logging into an online home appliance control interface while at work. Similarly, a conventional closed-circuit surveillance camera which required an application-specific control unit may now be replaced with an IP-based surveillance camera, which may be controlled by an authenticated user interface connected to the Internet, regardless of the physical location of the authenticated user interface.

As more electronic devices are brought into a realm of digital convergence and interoperability as "networked appliances" over local-area network (LAN) and wide-area network (WAN), it is increasingly becoming important to provide a coherent method and an apparatus to monitor and control networked appliances in both LAN and WAN intuitively. The existing method of monitoring and controlling networked appliances is largely confined to one-to-one command and control between an application-specific user interface and a networked appliance. For example, a dedicated video surveillance user interface which came as a bundle software with a video surveillance camera may allow a user to control or monitor the video surveillance camera, but not a networked refrigerator. In order to control or monitor the networked refrigerator, the user typically needs another dedicated user interface specifically designed to communicate with the networked refrigerator.

As a large number of electronic devices become connected to either a LAN or a WAN as networked appliances, they become increasingly challenging and difficult to track, monitor, or control just with a multiple number of bundle software. Therefore, it is highly advantageous to devise an apparatus and a method to provide an integrated user interface which coherently monitors and controls individual networked appliances in real-time.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

An apparatus for monitoring and controlling of networked appliances connected to an interoperable computer network including a wide-area network (WAN) and a local-area network (LAN) is disclosed. The apparatus comprises a Device State and Location Server (DSLS) configured to either receive beacons from the networked appliances periodically or poll the networked appliances to record a current activity status of each networked appliance, wherein the Device State and Location Server (DSLS) is operatively connected to the wide-area network (WAN), a commanding device operatively connected to the interoperable computer network, wherein the commanding device is configured to monitor and/or control a networked appliances through a unified user interface, and the unified user interface coupled to the commanding device, wherein the unified user interface is configured to monitor the current activity status of each networked appliance by accessing the Device State and Location Server (DSLS) instead of directly connecting to every networked appliance.

Furthermore, a method for monitoring and controlling networked appliances connected to an interoperable computer network including a wide-area network (WAN) and a local-area network (LAN) is disclosed. The method comprises establishing a network connection between a remote device and a Device State and Location Server (DSLS), wherein the network connection is either requested by a user or auto-negotiated by a communication protocol, updating a current activity status of the remote device to the Device State and Location Server (DSLS) by either transmitting a beacon to the Device State and Location Server (DSLS) periodically or polling the remote device periodically, authenticating a user to access the Device State and Location Server (DSLS), wherein the user is operating a user interface on a commanding device operatively connected to the Device State and Location Server (DSLS) via the interoperable computer network, and allowing the user to monitor the current activity status of the remote device by using the user interface configured to access information updates from the Device State and Location Server (DSLS), wherein the current activity status of the remote device is displayed on the user interface with a unique shape of an icon and/or a color coding scheme on the icon corresponding to the remote device.

Moreover, an apparatus for monitoring and controlling of networked appliances connected to an interoperable computer network including a wide-area network (WAN) and a local-area network (LAN) is disclosed. The apparatus comprises a Device State and Location Server (DSLS) configured to either receive beacons from the networked appliances periodically or poll the networked appliances to record a current activity status of each networked appliance, wherein the Device State and Location Server (DSLS) is operatively connected to the wide-area network (WAN), a commanding device operatively connected to the interoperable computer network, wherein the commanding device is configured to monitor and/or control a networked appliances through a unified user interface, the unified user interface coupled to the commanding device, wherein the unified user interface is configured to monitor the current activity status of each networked appliance by accessing the Device State and Location Server (DSLS) instead of directly connecting to every networked appliance, and an orbital user interface software operatively connected to the commanding device, wherein the orbital user interface software is configured to visualize a distance or a signal strength between the commanding device and each networked appliance relevant to a particular user by placing each networked appliance in a particular orbit circling around the commanding device.

DETAILED DESCRIPTION

Figure 1:
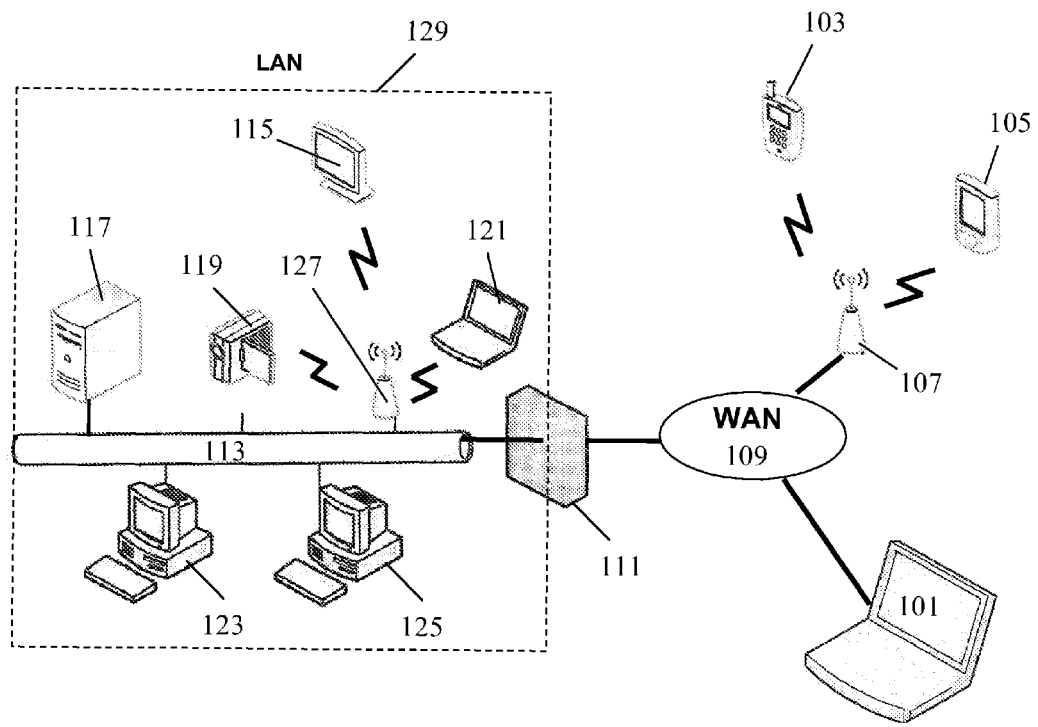
FIG. 1 shows a typical local-area network (LAN) configuration which is operatively connected to a wide-area network (WAN).

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and other symbolic representations that directly or indirectly resemble an apparatus and a method for real-time monitoring and controlling of networked appliances using an intermediate server. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of the invention, a term "networked appliance" is defined as an electronic device configured to be connected to a computer network, wherein the networked appliance is monitored or controlled by a user interface on a commanding device.

A term "commanding device" is defined as an electronic device configured to be connected to a computer network, wherein the commanding device monitors or controls networked appliances through a user interface on the commanding device.

A term "wide-area network" (WAN) is defined as a computer network defining a broad geographic area or a broad number of network equipment and connected devices. An example of a wide-area network (WAN) is the Internet.

A term "local-area network" (LAN) is defined as a small computer network covering a localized region such as home, office, or a building. In one example, a plurality of networked appliances and computers can be connected to the local-area network (LAN). A local-area network can be connected to a wide-area network (WAN), typically with a firewall in between as a local security protection from the WAN. In one example of local-area network, a series of Internet Protocol (IP) addresses (i.e. 192.161.0.xxx) are specifically designated to represent local-area network (LAN) connections.

A term "interoperable computer network" is defined as a compatible network encompassing both LAN and WAN for compatible device communication between a commanding device and a networked appliance configured to be monitored or controlled by a user interface on the commanding device. In one embodiment of the invention, a commanding device is simply a computer operatively connected to an interoperable computer network and a user interface on the commanding device is simply provided by a computer software installed on the computer. In another embodiment of the invention, a commanding device is a portable electronic device (e.g. a cellular phone) and a user interface on the commanding device is provided by a software installed on the portable electronic device.

A term "Device State and Location Server" (DSLS) is defined as a computer server configured to poll, receive, record, or transmit information from a networked appliance or a commanding device, wherein the computer server is an intermediate server managing, updating, or brokering at least some information between the networked appliance and the commanding device. In one embodiment of the invention, the DSLS records, updates, or transmits current activity status of a networked appliance to a commanding device when the networked appliance sends a beacon to the DSLS. In another embodiment of the invention, the DSLS records, updates, or transmits current activity status of a networked appliance to a commanding device when the DSLS or a user interface program on the commanding devices polls information from the networked appliance.

In general, embodiments of the invention relate to monitoring and controlling electronic devices connected to a computer network. In particular, the invention relates to an apparatus and a method for real-time monitoring and controlling networked appliances using an intermediate server such as a Device State and Location Server (DSLS).

As digital convergence and interoperable networks bring formerly standalone and/or application-specific electronic devices like a surveillance camera, a television, and home appliances to an interoperable computer network such as LAN and the Internet, the complexity of managing these connected devices with a heuristic and intuitive user interface program is becoming an important challenge in networked device communications.

The existing method of monitoring and controlling electronic devices (i.e. defined herein as "networked appliances") connected to an interoperable computer network is largely confined to one-to-one command and control between an application-specific user interface on a commanding device and a networked appliance. For example, a dedicated video surveillance user interface program which came as a bundle software with a video surveillance camera may allow a user to control or monitor the video surveillance camera, but not other networked appliances also connected to the interoperable computer network. In order to control or monitor other networked appliances, the user typically needs other dedicated user interfaces and device drivers specifically designed to communicate with those networked appliances As a large number of electronic devices become connected to either a LAN or a WAN as "networked appliances," they become increasingly challenging and difficult to track, monitor, or control just with a multiple number of discrete bundle software and separate device drivers. Therefore, it is highly advantageous to devise an apparatus and a method to provide a unified, single user interface which coherently monitors and controls individual networked appliances in real-time.

FIG. 1 shows an interoperable computer network (100) comprising a typical local-area network, or LAN (129) configuration which is operatively connected to a wide-area network, or WAN (109). In this example, the local-area network (129) is a home network comprising a computer server (117), a digital video recorder (119), a first laptop computer (121), a first desktop computer (123), a second desktop computer (125), a first wireless access router (127), and a display monitor (115). In the LAN (129) configuration as shown in FIG. 1, the digital video recorder (119), the display monitor (115), and the first laptop computer (121) are wirelessly connected to the LAN (129) by the first wireless access router (127). The first wireless access router (127) typically uses a 802.11-compatible wireless LAN protocol for providing wireless connection to a plurality of networked appliances (e.g. 119, 115, 121). On the other hand, the computer server (117), the first desktop computer (123), the second desktop computer (125), and the first wireless access router (127) are wired connections to a physical wire cable (113).

In the example shown in FIG. 1, the LAN (129) is protected from undesirable outside access and undesirable data packets by a firewall (111). The WAN (109) provides data communications to devices (e.g. 103, 105, 107, 101) outside the LAN (129). Like the LAN (129), the WAN (109) can use a physical wire for a device connection (i.e. a second laptop computer (101) wired to the WAN (109)) and a second wireless access point (107) for wireless connection to a plurality of networked appliances (e.g. 103, 105). The WAN (109) can be an Internet connection.

Continuing with FIG. 1, the interoperable computer network (100) as shown in FIG. 1 reflects a challenge that many users face today. The existing device management solutions do not address the complexity of keeping track of LAN-connected and WAN-connected networked appliances coherently, because a discrete device management software typically handles one specific device connected over a LAN or a WAN. In case of the interoperable computer network (100), a user typically is forced to juggle discrete device management software to monitor or control all connected devices (e.g. 101, 103, 105, 115, 117, 119, 121, 123, 125). The lack of an intuitive and unified user interface program configured to monitor and control all wireless and wired networked appliances registered for a particular user, whether the networked appliances are connected to a LAN or a WAN, places a significant information processing burden on the user. Furthermore, the existing device management solutions do not provide an integrated or unified method to monitor or change the current activity status of each LAN-connected or WAN-connected networked appliance simultaneously on a single screen, thereby reducing the effectiveness of device management in an interoperable computer network environment.

Therefore, the present invention discloses an apparatus and a method for real-time monitoring and controlling of networked appliances using an intermediate server called a "Device State and Location Server" (DSLS), which keeps track of current device activity by either receiving periodic beacons from each networked appliance or polling each networked appliance periodically. Furthermore, a novel, unified user interface program disclosed in the present invention allows intuitive and heuristic monitoring and controlling of all networked appliances registered to the DSLS for a particular user. In addition, a unique orbital user interface categorizing networked appliances by distance from a commanding device is disclosed as an effective program to monitor and control networked appliances in an interoperable computer network.

Figure 2:
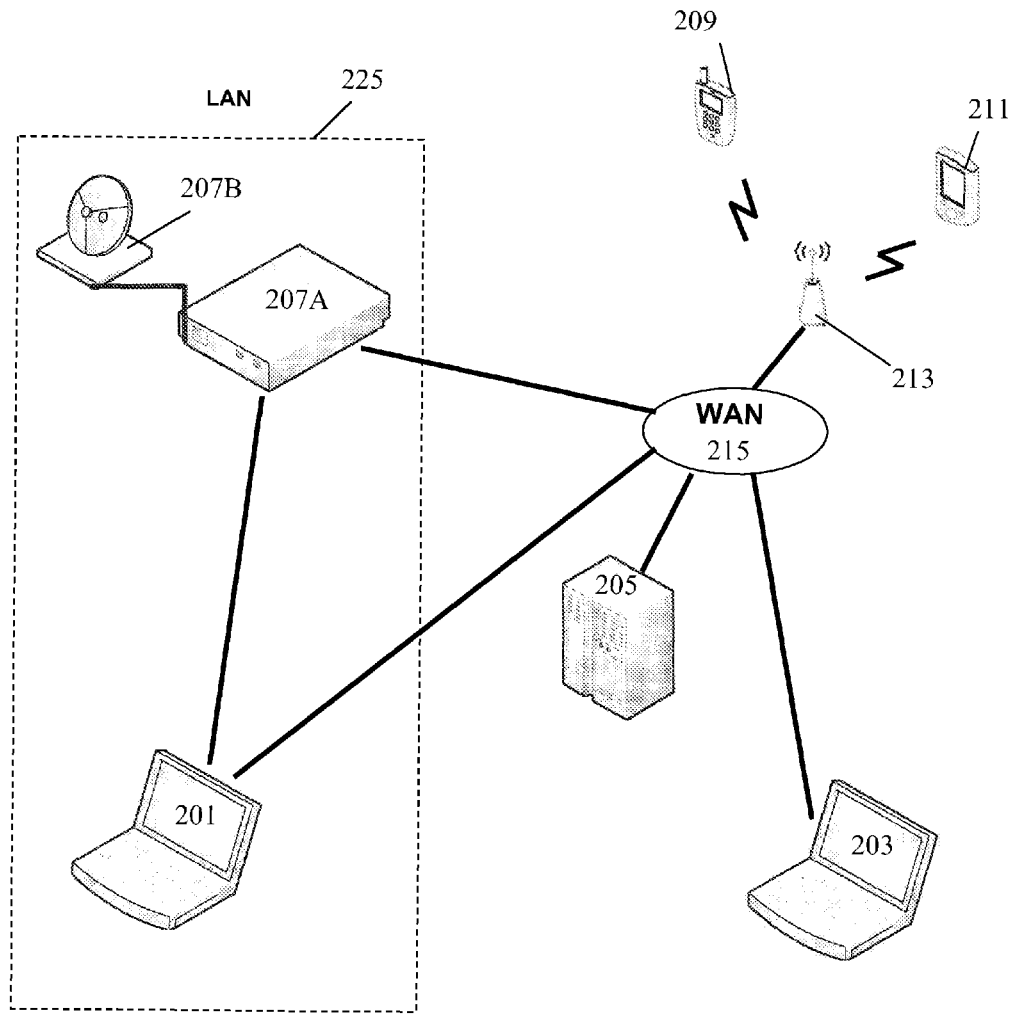
FIG. 2 shows users' computer terminals and networked appliances operatively connected to a local-area network (LAN) and a wide-area network (WAN) using a Device State and Location Server (DSLS) in accordance with an embodiment of the invention.

FIG. 2 shows an interoperable computer network (200) with users' computer terminals (201, 203) and networked appliances (207A, 207B, 209, 211) operatively connected to a LAN (225) and a WAN (215) with a Device State and Location Server, or DSLS (205) in accordance with a preferred embodiment of the invention. In this preferred embodiment of the invention, the users' computer terminals (201, 203) act as commanding devices to the networked appliances (207A, 207B, 209, 211) operatively connected to the interoperable computer network (200). In one embodiment of the invention, a first user's computer terminal (201) is located inside the LAN (225) while a second user's computer terminal (203) and the DSLS (205) are located in the WAN (215) outside the LAN (225).

In the preferred embodiment of the invention, each networked appliance (e.g. 207A, 207B, 209, or 211) is registered in the DSLS (205) server which acts as an intermediary and a storage for current activity status of each networked appliance (e.g. 207A, 207B, 209, or 211). The registration process of a typical networked appliance may involve a device driver installation and transfer of device-specific information to the DSLS (205) server. In one embodiment of the invention, this intermediary registration process of networked appliances (e.g. 207A, 207B, 209, and/or 211) enables a commanding device (e.g. 201 or 203) to use a single standard user interface (i.e. a "unifying" user interface) to control all registered networked appliances for a particular user. In the preferred embodiment of the invention, the DSLS (205) receives periodic "heart beats," or beacons from each networked appliance (e.g. 207A, 207B, 209, or 211) indicating its current activity status. Information contained in the current activity status of each device include, but are not limited to, "device online", "device offline", "device busy", and "device un-configured". The DSLS (205) server records the current activity status information for each networked appliance (e.g. 207A, 207B, 209, or 211) and relays the current activity status information to one or more commanding devices (e.g. 201, 203).

Continuing with FIG. 2, in the preferred embodiment of the invention, the DSLS (205) server also keeps track of icon classifications, time stamps, preview thumbnails, current IP addresses of devices, device MAC addresses, and communication port information for most networked appliances. Icon classifications for the networked appliances (e.g. 207A, 207B, 209, or 211) are useful for a unified user interface in a commanding device. For example, a wireless-LAN phone (209) and a handheld computer device (211) which are operatively connected to the interoperable computer network (200) via a wireless access router (213) can be categorized by the DSLS (205) with a phone icon for the wireless-LAN phone (209) and a pocket computer icon for the handheld computer device (211). Furthermore, recording time stamps are useful in counting the frequency of beacons from each networked appliance, and keeping track of current IP addresses, MAC addresses, and port information for each networked appliance allows the one or more commanding devices (e.g. 201, 203) to connect to a particular networked appliance directly if a user triggers a direct networked appliance connection using a unified user interface in a commanding device (201 or 203). In addition, the preview thumbnail information sent to the DSLS server is useful for video devices (e.g. 207A, 207B) among networked appliances (e.g. 207A, 207B, 209, or 211), because the preview thumbnail information can be used in a unified user interface of a commanding device (201 or 203) to represent video content.

As shown by the preferred embodiment in FIG. 2, the DSLS (205) act as an intermediate server which establishes connection between the DSLS (205) and each networked appliance (e.g. 207A, 207B, 209, or 211) to keep track of all of networked appliances' current activity status and other information, even as a unified user interface in a commanding device (201 or 203) has not established direct connection with any of the networked appliances and/or has not even been invoked in the commanding device (201 or 203).

In one embodiment of the invention, when a user invokes the unified user interface in the commanding device (201 or 203) and typically logs-in as an authenticated user to the DSLS (205), current activity statuses of all networked appliances registered for the user are immediately visible to the user from the DSLS (205), although no direct networked appliance-to-the commanding device (201 or 203) has been established yet. An intermediary role that the DSLS (205) takes between networked appliances (e.g. 207A, 207B, 209, or 211) and the commanding device (e.g. 201 or 203) is therefore highly advantageous, because the authenticated user using the commanding device (201 or 203) does not have to make direct connections to individual networked appliances (e.g. 207A, 207B, 209, or 211) if the authenticated user's desire is merely a passive monitoring of the networked appliances (e.g. 207A, 207B, 209, or 211).

In one embodiment of the invention, if the authenticated user wants a direct connection between the commanding device (201 or 203) and a particular networked appliance, the authenticated user can select an icon for the particular networked appliance in the unified user interface to invoke a direct connection command. This direct connection between the unified user interface and the particular networked appliance is sometimes necessary to control functions of the particular networked appliance or to access information beyond what is recorded in the DSLS (205). For example, in the interoperable computer network (200) of FIG. 2, a video server (207A) coupled with a live streaming video source (207B) may allow the authenticated user using the unified user interface of the commanding device (201 or 203) to receive streaming video data from the video server (207A) only if a direct connection is invoked manually from the unified user interface. In one embodiment of the invention, before the direct connection is invoked from the unified user interface manually, the unified user interface may only show DSLS-recorded information for the video server (207A)'s icon in the unified user interface.

As shown in FIG. 2 and its previous descriptions above, by utilizing the DSLS (205) as an intermediate server, the present invention offloads a cumbersome and arduous task of keeping track of current conditions and statuses of numerous network devices registered to a particular user over both the LAN (225) and the WAN (215), while also minimizing computational burden placed on a commanding device (201 or 203).

Figure 3:
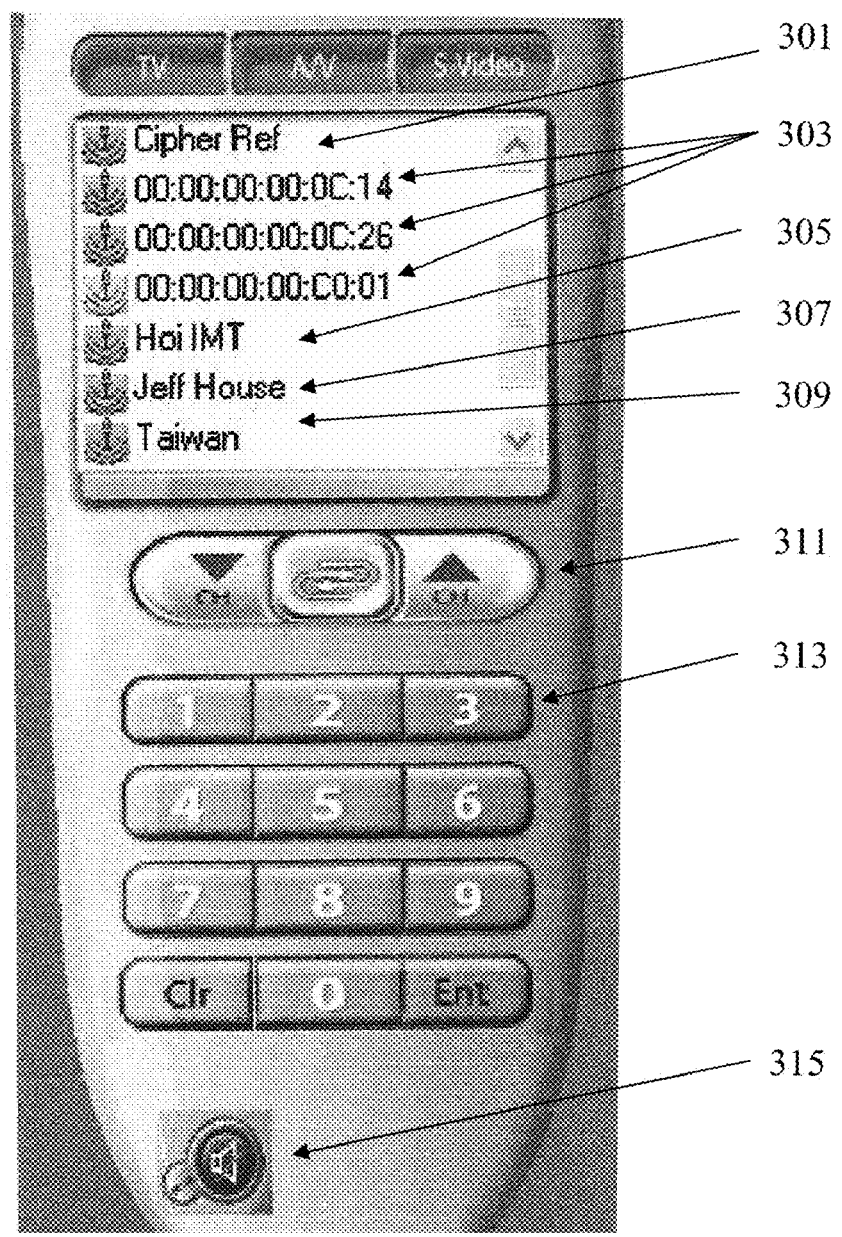
FIG. 3 shows an example of a unified user interface configured to monitor and control networked appliances in a local-area network (LAN) and a wide-area network (WAN) simultaneously in accordance with an embodiment of the invention.

FIG. 3 shows an example of a unified user interface (300) configured to monitor and control networked appliances in a local-area network (LAN) and a wide-area network (WAN) simultaneously in accordance with an embodiment of the invention. In a preferred embodiment of the invention, the unified user interface (300) is a computer software installed on a commanding device operatively connected to an interoperable computer network. In another embodiment of the invention, the unified user interface (300) is a discrete electronic device operatively connected to an interoperable computer network.

In the preferred embodiment of the invention, a plurality of registered icons and icon names (301, 305, 307, and 309) symbolize networked appliances which are already registered with a DSLS (205) of FIG. 2. In contrast, a plurality of unknown or unregistered devices are also shown in FIG. 3 as unnamed icons (303). In one embodiment of the invention, the unified user interface (300) also has a channel control (311) for changing video or audio channels of a networked appliance, if the networked appliance is a multimedia device. In one embodiment of the invention, the unified user interface (300) also contains a numerical keypad (313) and a speaker enable/disable button (315) for user convenience. It should be noted that the channel control (311), the numerical keypad (313), and the speaker enable/disable button (315) are merely optional and do not limit the scope of the novelty of the unified user interface (300) for providing a single universal user interface for monitoring and controlling all WAN and LAN-connected and registered devices for a particular user.

In one embodiment of the invention, a shape of an icon can distinguish one type of networked appliance (e.g. a digital video recorder) from another type of networked appliance (e.g. a laptop computer). Furthermore, in one embodiment of the invention, a color coding scheme of an icon representing a networked appliance indicates a current activity status of the networked appliance. For example, if the networked appliance is in a "device busy" mode, the color coding for the icon may be red. If the networked appliance is in a "device online" mode or a "device available" mode, the color coding for the icon may be green. Moreover, if the networked appliance is in a "device offline" mode, the color coding for the icon may be gray. The color coding scheme for indicating current activity status of each registered networked appliance is a unique aspect of the present invention. The color coding scheme for networked appliance icons enables a user to glance at the unified user interface (300) for a quick, intuitive monitoring of all registered networked appliances.

Continuing with FIG. 3, if a user needs a direct connection to a particular networked appliance called "Jeff House" (307) beyond passive monitoring information provided by the DSLS (205) of FIG. 2, then the user can invoke the direction connection to the particular networked appliance (307) by taking actions such as double-clicking on an icon or an icon name in the unified user interface (300) for the particular networked appliance (307).

A major advantage of the unified user interface (300) in accordance with an embodiment of the invention is that a user can monitor all networked appliances in a LAN and a WAN in a centralized and coherent user interface (e.g. 300), instead of using a plurality of device-specific management software to monitor and control a variety of networked appliances. The unified user interface (300) of FIG. 3 significantly reduces information processing burden from the user while providing an intuitive and rapid monitoring capability of networked appliances in a single user interface screen.

Figure 4:
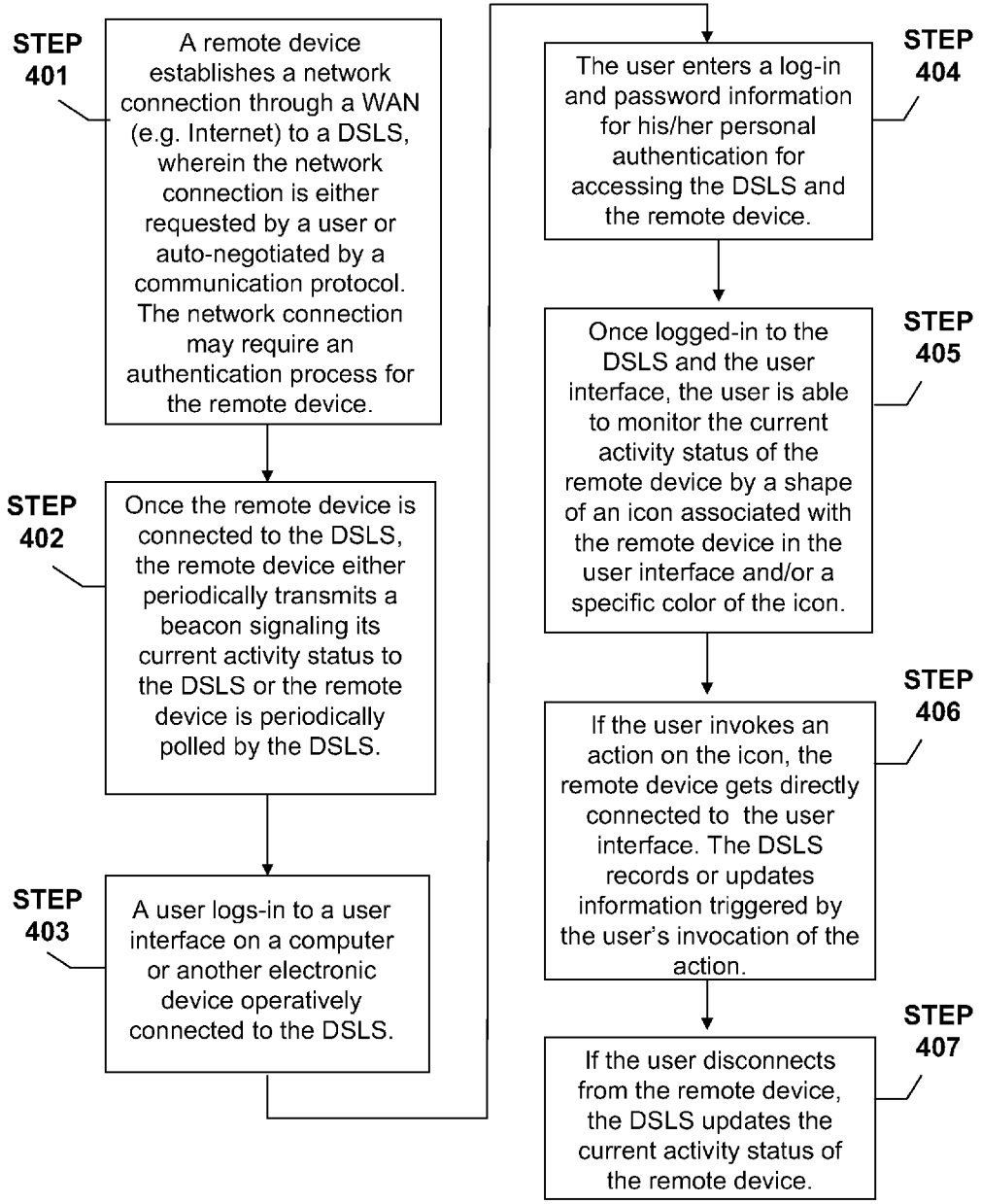
FIG. 4 shows a method for monitoring and controlling networked appliances using a Device State and Location Server (DSLS) in accordance with an embodiment of the invention.

FIG. 4 shows a method for monitoring and controlling networked appliances using a Device State and Location Server (DSLS) in accordance with an embodiment of the invention. In STEP 401, a remote device establishes a network connection through a wide-area network (WAN) such as the Internet, a cellular network, and/or WiMAX to a DSLS, wherein the network connection is either requested by a user or auto-negotiated by a communication protocol. In one embodiment of the invention, the network connection may require an authentication process for the remote device to prevent an unwanted device from connecting to the DSLS. If the remote device has never been connected to the DSLS before, the remote device typically goes through a registration process with the DSLS to submit required information to the DSLS.

Then, in one embodiment of the invention, once the remote device is connected to the DSLS, the remote device periodically transmits a beacon signaling its current activity status to the DSLS, as shown in STEP 402. In another embodiment of the invention, once the remote device is connected to the DSLS, the DSLS polls current activity status from the remote device periodically instead of waiting for the beacon, as also shown in STEP 402.

In STEP 403, a user logs-in to a user interface on a computer or another electronic device operatively connected to the DSLS. Then, if the DSLS requires a certain level of user authentication and security, the user enters a log-in and password information for his/her personal authentication for accessing the DSLS and the remote device, as shown in STEP 404. In one embodiment of the invention, a successful completion of the personal authentication with the DSLS enables the user to access at least some of his or her registered networked appliances over the LAN and the WAN.

Continuing with FIG. 4, in STEP 405, the user is able to monitor the current activity status of the remote device by a shape or a color coding scheme of an icon associated with the remote device in the user interface, after the user successfully logged-in to the user interface and the DSLS. Then, in STEP 406, if the user invokes an action on the icon (e.g. selecting the icon associated with the remote device and/or double-clicking on the icon), the remote device gets directly connected to the user interface. In one embodiment of the invention, the DSLS also records or updates information triggered by the user's invocation of the action. For example, the DSLS may change the current activity status of the remote device to "device busy" if the remote device is designed to be accessed by only one user. In another example, the DSLS may record some information continuously for the remote device until the user disconnects from the remote device. Yet in another example, the DSLS may update some information related to an interaction between the user and the remote device, if a particular event is triggered by the user.

In STEP 407, if the user disconnects from the remote device, the DSLS updates the current activity status of the remote device. In one embodiment of the invention, the DSLS may change the current activity status of the remote device to "device available" from "device busy" if the remote device is designed to be accessed by only one user and is now disconnected from the user.

Figure 5:
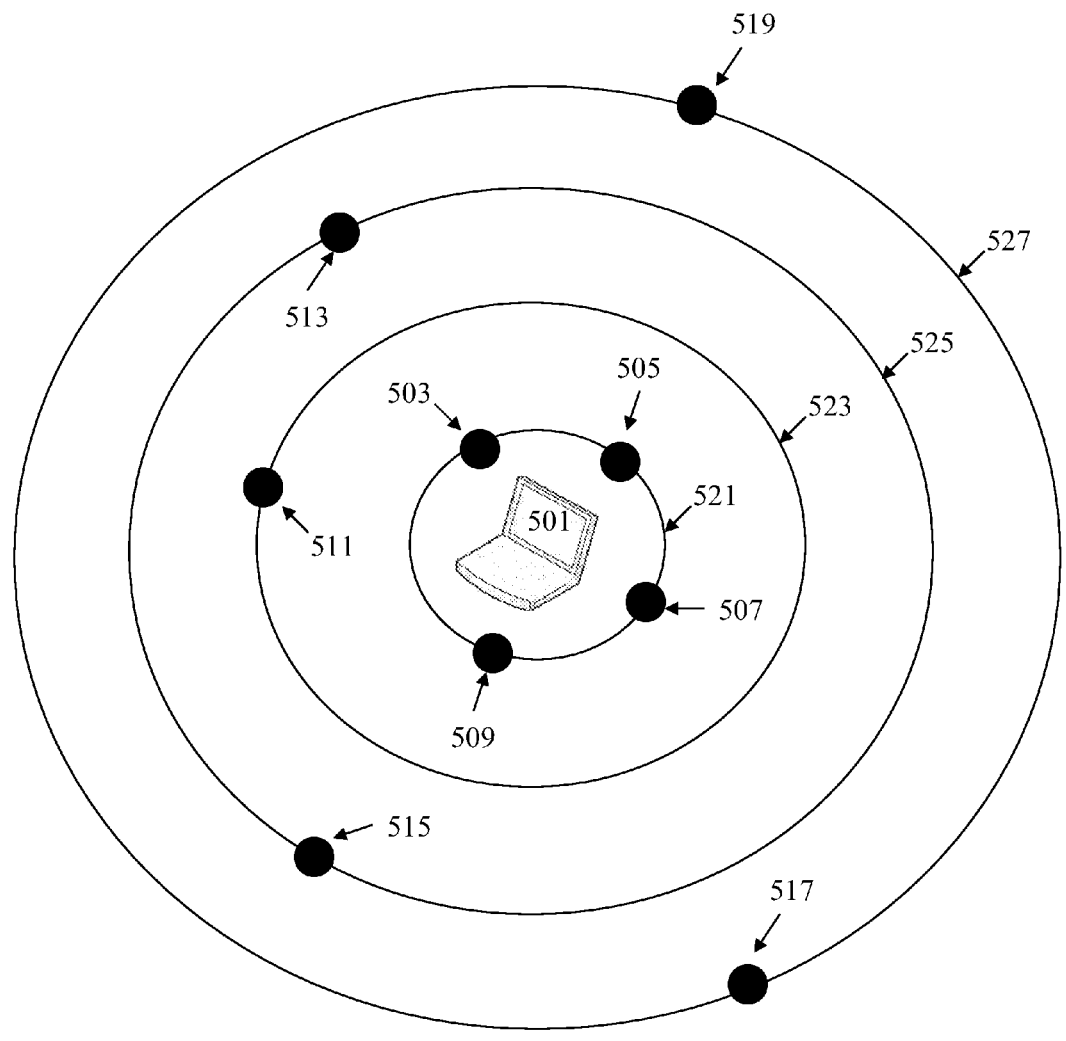
FIG. 5 shows a screenshot of a user interface software configured to monitor and control networked appliances in a local-area network (LAN) and a wide-area network (WAN), wherein the networked appliances are represented as orbital nodes circling around a user's computer terminal in accordance with an embodiment of the invention.

FIG. 5 shows a screenshot of an orbital user interface software (500) configured to monitor and control networked appliances in a local-area network (LAN) and a wide-area network (WAN), wherein the networked appliances are represented as orbital nodes (e.g. 503, 505, 507, 509, 511, 513, 515, 517, 519) circling around a commanding device (501) (e.g. a user's computer terminal) in accordance with an embodiment of the invention. In a preferred embodiment of the invention, a proximity of an orbit (521, 523, 525, or 527) to the commanding device (501) in the center symbolizes a geographic proximity of a networked appliance to the commanding device (501). In one embodiment of the invention, an approximation of geographic proximity of a networked appliance to the commanding device (501) can be deduced or extrapolated from internet protocol (IP) addresses of the commanding device (501) and the networked appliance. A DSLS can be utilized to track and update distance relationships among orbital nodes (e.g. 503, 505, 507, 509, 511, 513, 515, 517, and 519) which symbolizes networked appliances and the commanding device (501). A color coding scheme on the orbital nodes can also represent current activity status of each networked appliance represented by a discrete orbital node.

Furthermore, the orbital relationship among the commanding device (501) and orbital nodes (e.g. 503, 505, 507, 509, 511, 513, 515, 517, 519) can dynamically change if a user moves around with the commanding device (501) geographically or logs-in to the user interface software installed on another commanding device located at a different region. Moreover, if a geographical location of a particular networked appliance connected to an interoperable computer network changes, an orbital relationship among the particular networked appliance, other networked appliances, and the commanding device (501) can also dynamically change.

The orbital user interface software (500) is an intuitive and novel method of visualizing a user's registered devices in the LAN and the WAN in a single screen. In one embodiment of the invention, a user can also establish a direct connection to any of the nodes (503, 505, 507, 509, 511, 513, 515, 517, 519) by double-clicking on a particular node.

Continuing with FIG. 5, four nodes (503, 505, 507, 509) on a closest orbit (521) to the commanding device (501) can represent LAN-connected networked appliances in an interoperable computer network environment. A node (511) on a second-closest orbit (523) can represent a networked appliance in the WAN which is still geographically close to the commanding device (501), but not as close as LAN-connected networked appliances. Likewise, two nodes (513, 515) on a third-closest orbit (525) can represent two networked appliances in the WAN which is geographically farther away from the commanding device (501), compared to the node (511). Lastly, two outermost nodes (517, 519) on a fourth-closest orbit (527) can represent two networked appliances in the WAN which is geographically even farther away from the commanding device (501) compared to the two nodes (513, 515) on the third closest orbit (525).

In another embodiment of the invention, the orbital user interface software (500) can place orbital nodes (e.g. 503, 505, 507, 509, 511, 513, 515, 517, 519) on a particular orbit (521, 523, 525, or 527) around the commanding device (501) based on signal strengths of each networked appliance symbolized by a particular orbital node (e.g. 503, 505, 507, 509, 511, 513, 515, 517, or 519). For instance, a wireless networked appliance receiving a higher signal strength from a nearby wireless access point can be placed on an orbit closer to the commanding device (501) than another wireless networked appliance receiving a lower signal strength to the same or different wireless access point. This orbital representation of nodes can also be used in combination with the preferred embodiment described above, which is based on geographic distance among networked appliances symbolized by nodes and the commanding device (501).

Continuing with FIG. 5, in one embodiment of the invention, a particular node among the orbital nodes (e.g. 503, 505, 507, 509, 511, 513, 515, 517, 519) can be dragged to another node or to a commanding device (e.g. the commanding device (501)) to invoke a direct connection attempt between a networked appliance represented by the dragged node and another networked appliance or the commanding device represented by a drop-off destination of the dragged node. Furthermore, in one embodiment of the invention, when a direct connection between two networked appliances or a commanding device and a networked appliance is successful, a line can be generated between the dragged node and the drop-off destination of the dragged node to display the successful connection for the orbital user interface software (500).

The orbital user interface software (500) of FIG. 5 presents an intuitive and novel method of visualizing the user's registered devices in the LAN and the WAN in a single screen. In one embodiment of the invention, the user is empowered to visualize whereabouts of his or her registered networked appliances in the LAN and the WAN in one coherent user interface by utilizing a DSLS to provide a dynamic update of IP addresses for the orbital nodes (e.g. 503, 505, 507, 509, 511, 513, 515, 517, 519) and the commanding device (501). Furthermore, in one embodiment of the invention, the user is able to monitor current activity status of each networked appliance by inspecting a color coding on each orbital node.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for monitoring and controlling of networked appliances connected to an interoperable computer network including a wide-area network (WAN) and a local-area network (LAN), the apparatus comprising:
a Device State and Location Server (DSLS), which receives beacons from the networked appliances periodically or polls the networked appliances to record a current activity status of each networked appliance, wherein the Device State and Location Server (DSLS) is operatively connected to the wide-area network (WAN);
a commanding device operatively connected to the interoperable computer network, wherein the commanding device monitors and/or controls the networked appliance through a unified user interface;
the unified user interface coupled to the commanding device, wherein the unified user interface monitors the current activity status of each networked appliance by accessing the Device State and Location Server (DSLS) instead of directly connecting to every networked appliance; and
an orbital user interface software operatively connected to the commanding device, wherein the orbital user interface software enables visualization of an approximate physical distance or an approximate signal strength between the commanding device and each networked appliance by placing a particular networked appliance as a "node" in a particular orbit, which encircles the commanding device in a center of the particular orbit.

2. The apparatus of claim 1, wherein the orbital user interface software enables display of the node representing the particular networked appliance in the particular orbit, wherein a closer proximity of the particular orbit to the center of the particular orbit symbolizes a closer physical distance between the commanding device and the particular networked appliance, or a stronger signal strength between the commanding device and the particular networked appliance.

3. The apparatus of claim 1, wherein the orbital user interface software uses a first color coding scheme to indicate the current activity status of each networked appliance.

4. The apparatus of claim 1, wherein the unified user interface uses different shapes of icons to indicate different types of networked appliances.

5. The apparatus of claim 1, wherein the unified user interface uses a second color coding scheme to indicate the current activity status of each networked appliance.

6. The apparatus of claim 1, wherein the current activity status recorded in the Device State and Location Server (DSLS) includes information related to "device online," "device offline," "device un-configured," "device busy", and/or "device available" modes.

7. The apparatus of claim 1, wherein the Device State and Location Server (DSLS) records icon classifications, time stamps, preview thumbnails, current IP addresses of devices, device MAC addresses, and communication port information of one or more networked appliances.

8. The apparatus of claim 1, wherein the unified user interface enables a user to invoke a direct device connection by allowing the user to drag-and-drop another node in an orbit representing another networked appliance to the node representing the particular networked appliance using the orbital user interface software.

9. A method for monitoring and controlling networked appliances connected to an interoperable computer network including a wide-area network (WAN) and a local-area network (LAN), the method comprising:
establishing a network connection between a remote device and a Device State and Location Server (DSLS), wherein the network connection is either requested by a user or auto-negotiated by a communication protocol;
updating a current activity status of the remote device to the Device State and Location Server (DSLS) by either transmitting a beacon to the Device State and Location Server (DSLS) periodically or polling the remote device periodically;
authenticating a user to access the Device State and Location Server (DSLS), wherein the user is operating an orbital user interface software coupled to a commanding device operatively connected to the Device State and Location Server (DSLS) via the interoperable computer network; and
allowing the user to monitor the current activity status of the remote device by using the orbital user interface software, which accesses information updates from the Device State and Location Server (DSLS), wherein the current activity status of the remote device is displayed using the orbital user interface software, which enables visualization of a physical distance or a signal strength between the commanding device and the remote device by placing the remote device in an orbit closer to or farther away from a center of the orbit, depending on a physical proximity of the remote device to the commanding device or a signal strength between the remote device and the commanding device.

10. The method of claim 9, further comprising a step of invoking an action on the remote device by clicking or dragging an icon or a node representing the remote device in the orbit from the orbital user interface software, wherein the step of invoking the action on the remote device enables transmission of information beyond what is available via the Device State and Location Server (DSLS).

11. The method of claim 10, wherein the step of invoking the action on the icon or the node in the orbit to establish the action between the remote device and the user interface on the commanding device triggers the Device State and Location Server (DSLS) to record new information related to the remote device.

12. The method of claim 10, further comprising a step of stopping the action between the remote device and the orbital user interface software coupled to the commanding device, wherein the step of stopping the action triggers the Device State and Location server (DSLS) to record new information related to the remote device.

13. An apparatus for monitoring and controlling of networked appliances connected to an interoperable computer network including a wide-area network (WAN) and a local-area network (LAN), the apparatus comprising:
- a Device State and Location Server (DSLS), which receives beacons from the networked appliances periodically or polls the networked appliances to record a current activity status of each networked appliance, wherein the Device State and Location Server (DSLS) is operatively connected to the wide-area network (WAN);
- a commanding device operatively connected to the interoperable computer network, wherein the commanding device monitors and/or controls networked appliances through a unified user interface;
- the unified user interface coupled to the commanding device, wherein the unified user interface monitors the current activity status of each networked appliance by accessing the Device State and Location Server (DSLS) instead of directly connecting to every networked appliance; and
- an orbital user interface software operatively connected to the commanding device, a CPU, and a memory unit, wherein the orbital user interface software enables visualization of an approximate physical distance or an approximate signal strength between the commanding device and each networked appliance relevant to a particular user by placing each networked appliance in a particular orbit encircling the commanding device represented by a center point of the particular orbit.

14. The apparatus of claim 13, wherein the orbital user interface software uses a first color coding scheme to indicate the current activity status of each networked appliance.

15. The apparatus of claim 13, wherein the unified user interface uses different shapes of icons to indicate different types of networked appliances.

16. The apparatus of claim 13, wherein the unified user interface uses a second color coding scheme to indicate the current activity status of each networked appliance.

17. The apparatus of claim 13, wherein the current activity status recorded in the Device State and Location Server (DSLS) includes information related to "device online," "device offline," "device un-configured," "device busy", and/or "device available" modes.

18. The apparatus of claim 13, wherein the Device State and Location Server (DSLS) to records icon classifications, time stamps, preview thumbnails, current IP addresses of devices, device MAC addresses, and communication port information of one or more networked appliances.

19. The apparatus of claim 13, wherein the unified user interface controls a particular networked appliance by making a direct connection to the particular networked appliance when a user invokes direct connection action from the unified user interface.

* * * * *